United States Patent [19]

Riseman et al.

[11] Patent Number: 4,675,743
[45] Date of Patent: Jun. 23, 1987

[54] ELECTRONIC PUBLISHING

[75] Inventors: John H. Riseman, Dover; Alice M. D'Entremont, Boston; H. Philip Peterson, Woburn, all of Mass.

[73] Assignee: Rise Technology Inc., Cambridge, Mass.

[21] Appl. No.: 873,726

[22] Filed: Jun. 12, 1986

Related U.S. Application Data

[62] Division of Ser. No. 699,917, Feb. 8, 1985.

[51] Int. Cl.[4] .............................................. H04N 1/40
[52] U.S. Cl. ..................................... 358/263; 358/280
[58] Field of Search ....................... 358/263, 280, 284; 382/34, 39

[56] References Cited

U.S. PATENT DOCUMENTS 3,980,309  9/1976  Cook .................................... 358/263
4,606,069  8/1986  Johnsen .............................. 358/263

Primary Examiner—Edward L. Coles, Sr.
Attorney, Agent, or Firm—Schiller, Pandiscio & Kusmer

[57] ABSTRACT

A novel electronic printing system for operating both a linear-raster electro-optical display device and a linear-raster type printer, which system is capable of integrating alphanumeric and/or graphics information and gray-scale or picture information, all on a single data base from which one may either (or both) print the data out on the printer as images, or display the data on the device as images. The system includes look-up tables storing respective first and second subsets of a set of substantially disjoint multiple-bit binary index numbers. Each of the numbers of the first subset represent information corresponding to a respective gray-scale density level rendered as a respective matrix of points forming a corresponding gray-scale cell to be printed by the printer. Each of the numbers of the second subset represent information corresponding to a unique shape of an edge rendered as a respective matrix of points to be printed by the printer. Means are provided for translating an image of the information to be printed and/or displayed into an array of index numbers selected from the subsets, and for storing that array. Conversion means are provided for converting at least a major portion of the array into electrical signals for forming a display of substantially the desired image on the display device and for converting at least a major portion of the array into electrical signals for forming matrices for assemblage as the image in printed form on the printer.

9 Claims, 5 Drawing Figures b c a a b c e d

ELECTRONIC PUBLISHING

This application is a divisional application of our copending application Ser. No. 699,917, filed Feb. 8, 1985, for Electronic Publishing.

This invention relates to electronic publishing, a technology employing electronic means for creating, storing, revising, transmitting and on-demand printing of documentation.

Many companies, particularly those engaged in highly technical product development and sales, have many product lines and products in their the business portfolios. An exceedingly large number of different documents needed to support each product may have to be kept on hand. A continuous flow of requests for such documents tend to be constantly received from prospects, customers, field salesmen, international sales, customer training, distributors, and service. Literature shortages that delay the fulfilling of such document requests may result in poor field morale, unhappy customers, and, ultimately, lost business. A hiatus in supply, for example of instruction manuals, may result in late shipments and delayed or even diminished revenues.

If document shortages, and the problems they cause, are to be avoided, printed material should be treated in the same manner as manufacturing inventory. As new documents are printed, they should go through receiving, be inspected, sent to the literature distribution room, logged into the literature inventory, and placed in an assigned shelf space. To know when it is time to reorder, either a continuous inventory should be maintained by logging each piece of literature as it is sent out or, alternatively, reorder points must be established and periodic inventories need be taken. The costs of inventorying product support documentation, including the not insignificant cost of the space taken up by the material, can be quite high. In addition, one must also consider the cost of keeping artworks, photographs, flats, printer's negatives and the like on file to allow documents to be revised and reprinted.

A company's literature frequently needs revision because product specifications tend to change, engineering revisions are often made on existing products and must be communicated to field service personnel, new applications for products arise and need to be documented for the field sales force, and mistakes found in instruction manuals have to be corrected. Since it is almost impossible to predict when a particular document will require revision, it is difficult to estimate how many should be printed at any time. Although the cost per copy of printing goes down as the press run goes up, ordering a large press run risks having the savings wiped out when a revision necessitates scrapping literature. Too small a press run means an excessively high piece price, plus the price of reordering and reinventorying. Even with the best of planning, unanticipated revisions obsolete a significant fraction of the literature inventory.

A company may either set up an in-house printing facility or send its printing to outside shops. Inhouse facilities require additional trained personnel, space and management time. Outside printing requires additional scheduling, obtaining competitive bids, issuing of purchase orders, inspecting incoming material for quantity and quality, and routing the material to the literature inventory room.

The preparation of technical support documentation by conventional methods without electronic publishing, may require considerable effort and coordination among a large number of individuals such as engineers, writers, photographers, designers, typesetters and printers. Writers must work, often hand in hand with technical personnel such as engineers and scientists, to produce technically accurate copy. Illustrators may be needed to make drawings and diagrams, or photographers may be retained to produce photographs to be included in the copy. The document must be laid out. Copy needs to be typeset and proofread against the original test. Drawings may be photostatted to size and pasted-up to produce artwork for the printer. Using a special camera, the printer usually produces negatives that are used to make proofs which must be examined for mistakes in paste-up and for imperfections in the art work or film. The reproduction of photographs also involves cropping, sizing and converting the photograph into half-tone negatives for conversion to printing plates. Only when all of these steps, and possibly many others, are completed, may printing actually begin.

To circumvent the many problems encountered when documents are provided by conventional means, digital computer-controlled electronic devices, known as electronic publishing systems, are being increasingly used in the preparation, revision, storage and printing of documentation. Such publishing systems should be capable of handling documents containing all of the various categories of printed materials such as any combination of typographic characters, line art and continuous tone pictures. As used herein, the term "typographic characters" is intended to include, but not be limited to, letters of alphabets (e.g. Roman, Russian, Greek, Arabic, Armenian and Kanji), ideographs (e.g. Chinese and Japanese), numbers, punctuation marks and accents, and mathematical and scientific symbols, in any and all fonts, point sizes and spacing. As used herein, the term "line art" is intended to include a variety of lines-on-plane images such as graphs, charts, engineering drawings, schematics, outline sketches and the like. The term, "pictures" refers to continuous tone images, such as photographs, frames of video, half-tone reproductions and the like.

Electronic publishing systems typically comprise mass storage means or memory for electronic storage of information, a workstation for the user to provide input data and instructions for the creation and revision of documents, an appropriately programmed digital host computer, and electronic printing means for printing documents in accordance with electrical signals provided by the computer. The term "electronic printing", as used herein, includes means for producing, under computer control, plain paper hardcopy or reproduction masters, e.g. printing plates, photosensitive paper, film or like materials. An important type of printing device, particularly useful in the present invention, is a horizontal line-raster printer, (hereinafter simply referred to as a line-raster printer) e.g. typically one in which a light beam is adapted to be (1) focussed to a small spot on a photosensitive surface, (2) intensity-modulated by an electrical signal, (3) rapidly deflected so as to sweep the spot along a first line between margins, and (4) returned to the beginning margin with a small displacement normal to the sweep line so as to be positioned for sweeping along a second line parallel to the first line. One type of such a line-raster printer, known as the laser printer, employs a laser beam as the light beam, and forms a printable image on a xerographic surface from which plain paper hardcopy may be produced by conventional xerographic techniques. Another category of line-raster printers, known as electronic typesetters, use a laser beam or light from a fiber-optic cathode ray tube to produce a printable image on photosensitive film. The film may be used to make printing plates for document reproduction on conventional letterpress or offset presses.

A typical workstation includes a high-resolution electrooptical imaging device (e.g. 1000 to 2000 lines), typically a cathode ray tube (CRT) terminal for displaying images of the pages being created and revised; a keyboard for text entry and correction; and a screenpointing and control device such as a "mouse" or "trackball". The workstation eliminates the timeconsuming paste-up of blocks of typeset text and graphics onto flats, thereby simplifying preparation and revision of documents. Through the agency of the workstation and the assistance of the host computer, documents can be created using a set of rules for page layout, including such parameters as margin width, column width, type style or font, type size, line spacing and justification.

To create a document, the text intended to appear on a page in entered into the system either at the workstation or at a remote word-processing terminal linked to the system computer by a conventional communications line. A typeset version of the test is produced based on the key strokes and operator-selected choices of font, margins, column width and line spacing, thus permitting the operator to see a page image, i.e. a preview of how each page will look when printed, and permits proofreading and editing of the typeset text directly on the screen. At a scale of one-to-one, the page image will be the same size as the page to be printed, the individual characters appearing in the same size, typestyle and at the same coordinates as they will appear on the printed page. Some systems also permit display of line drawings and other graphic elements, as well as typographic characters.

Images of typographic characters, line art and other graphics are formed on the workstation screen from a series of display pixels (basic picture elements) provided by control of the excitation of the tube phosphor at each point on the display. The visual intensity of the phosphor points are controlled in a binary (i.e. on-off) manner by an electronically stored array of single-digit binary numbers or bits, the array being known as a bit-map. Each number of the array corresponds to a pixel on the screen, the rows of the arrays corresponding to the raster lines. In most systems, each raster line displayed on the CRT has a width or height about equal to the pitch of the line, i.e. the spacing between raster lines, center to center. Each raster line is divided into segments each of which constitutes a pixel, each segment being dimensioned so that horizontal and vertical lines on the screen, when one pixel wide, will have the same width. Thus, the resolution, expressed in pixels/inch, is typically the same as the pitch.

Similarly, a bit may may be used to carry out electronic printing on a line-raster printing device. In such instance, a series of small pixels are electronically printed onto a substrate under the control of a bit map, the printed matter being rendered with an intensity contrasting with the substrate or background. While it is possible to drive a line-raster printing device with the same bit map used to generate the page image on the CRT, this is not generally done because the printing is of inferior quality because of the relatively low resolution of the bit map While there are obvious economic advantages in using the screen bit map to produce electronically printed pages, limitations in reasonable-cost, commercially available technology limit CRT displays to about 2000 lines of resolution. On the other hand, even a relatively low-resolution, laser, line-raster printer with a resolution specification of 240 lines per inch (or 2,640 lines to output an 11-inch page) has a higher resolution than most high-resolution workstation screens. A 400 line per inch printer requires 4,400 lines to output a page, and a 1000 line per inch laser-to-film device requires 11,000 lines.

Thus, generally a second, higher resolution bit map is produced within the line-raster printing device from a series of commands and text strings sent from the workstation to processing means in the line-raster printing device. Such processing means typically comprising a microprocessor, memory and means for generating a bit map, uses digital descriptions of the various typographic characters stored in its memory, to build a bit map of greater detail than the one used to control the display. The use of separate microprocessors and bit maps in the host computer and the raster printing device increases the complexity and cost of the electronic publishing system.

It is desirable that electronic publishing systems be able to display and print continuous-tone pictures such as photographs and frames of video. Consequently, continuous-tone pictures are typically digitized into an array of numbers larger than one binary bit, wherein each number or gray-scale pixel represents the leve of gray at a point within the image that has been sampled and expressed as a number. For example, an array of two digit (or bit) binary numbers allows four levels of gray to be displayed, whereas, eight-bit binary numbers or bytes, allow 256 levels to be displayed. In practice, six-bit binary numbers (allowing 64 levels of gray to be displayed) represent a good compromise between limiting the size of the binary numbers used and maintaining the quality of the image displayed. The use of less than six-bit numbers usually cause the display of photographs and other gray-scale images to contain certain artifacts due to the different levels of gray within the picture appearing as visible bands.

Several limitations of the bit-map displays makes the use of gray-scale displays preferable in electronic publishing systems. Bit map displays are unable to display continuous-tone pictures and images except as low-resolution dithered pictures, that is, crude images having the brightness or darkness of relatively large local areas of the picture represented by differing numbers of on and off display pixels at different areas of the screen. Another limitation of the bit-mapped display is the so-called staircase effect in which the diagonal edges of typographic characters and line art displayed on the screen have a jagged or saw-tooth appearance. The staircase effect can be largely overcome on gray-scale displays by displaying the pixels that would form notches in diagonal edges on a bit map display at intensities intermediate to the on and off states. The technique, well known as anti-aliasing, is quite desirable because, at any given screen resolution, the legibility of displayed alphanumeric characters appears to be enhanced, making them look more like the corresponding printed version.

As is well known to those acquainted with the printing arts, the reproduction of continuous tone pictures (such as photographs) on plain paper involves the use of a half-tone pattern, a family of small shapes, typically dots or lines typically printed at regular intervals of, usually 50 to 150 per inch.

Half-tone patterns can be produced on the electronic printing device by dividing the page into small, equal-sized, rectangular, preferably square areas or cells. Each cell has a cluster of printed dots arranged within it. A small cluster of printed dots corresponds to a light gray gray-scale pixel and a large cluster corresponds to a dark gray gray-scale pixel. The family of these cells constitutes a set termed hereinafter "super-pixels."

Super-pixels are printed by the line-raster printing device by dividing the bit map into small sub-arrays, the size of which determines the number of different gray-scale values that can be expressed. For example, to print images with 64 density levels of gray, a cell or super-pixel eight raster lines in height and eight printing dots across can be utilized. Thus, one can provide 64 cells each having a unique density level provided by a respective matrix of dots or points. A light gray super-pixel can be produced by printing only a few dots inside the cell, whereas a dark gray super-pixel can be produced by printing all but a few of the maximum possible 64 dots within the cell.

A coding scheme using weighted sets of two-dimensional functions, known as area character coding, was developed by Altemus and Schaphorst to achieve compression in facsimile transmission, but was apparently not considered favorable for gray-scale imagery according to W. K. Pratt, *Digital Image Processing*, John Wiley & Sons, N.Y., 1978, pp. 705–706.

To simplify the mapping process, each of the different super-pixels can be assigned a unique super-pixel index number, usually in binary form. For example, a super-pixel index number of 111111 can be assigned to a light gray or white super-pixel and 000001 to a very dark gray super-pixel. These index numbers can be also used to set the intensity of the CRT screen display, 111111 turning a selected portion of the screen phosphor on to full brightness and 000001 setting the screen phosphor intensity at that or another portion to almost the minimum level. Super-pixel index numbers thus representing the intensity of a gray-scale pixel in a picture on the CRT screen can also be used to map the appropriate super-pixel within the printing device. Further, the gray-scale super-pixel index number (in the above example) is only six bits as opposed to the sixty four bits used in the bit map to print the equivalent of the super-pixel. This, in effect, represents a data compression of better than ten-to-one.

Some electronic typesetters (providing resolutions in excesss of 1000 lines per inch) feature so-called half-tone screen generation, i.e. within specified area of a page image, a half-tone picture can be printed from an array of gray-scale values using a super-pixel scheme. However, when applied to laser printers, the super-pixel scheme is of only limited usefulness. In most publishing applications, continuous-tone images are reproduced at a resolutions of 50 to 150 gray-scale pixels per inch. To reproduce pictures with a resolution of 100 gray-scale pixels per inch, super-pixels eight raster lines in height are required to reproduce pictures with 64 levels of gray. In order to print half-tone pictures at a resolution of 100 super-pixels per inch, a laser printer with a resolution of 800 lines per inch is required. This is much higher than that of the inexpensive, currently-available laser printers typically having resolutions in the range of 240 to 400 raster lines per inch. The alternatives, so far, have been the printing of gray-scale pictures with 64, or more, levels of gray, but at resolutions far less than 100 gray-scale pixels per inch; the printing of pictures at 100 pixels per inch, or higher, but with far fewer levels of gray than 64; or, most frequently, the printing of pictures at resolutions of less than 100 gray-scale pixels per inch with less than 64 levels of gray.

When individual copies of documents are to be printed on-demand on a laser printer, each page may be different. If the electronic publishing system is be able to print the document at the rated printing speed of the printing device, hardware for generating the printer bit map must be able to generate new maps at not less than the printing rate of the printing device. As the resolution of the printer is increased, the size of the map grows as the square of the increase, limiting the on-demand printing capability of the electronic publishing system. For example, to print an $8\frac{1}{2} \times 11$ inch page, a laser printer with a resolution of 240 lines per inch requires a bit map containing 5,385,600 bits. Raising the printer resolution to 800 lines per inch (needed to print 100 64-level super-pixels per inch) requires a map containing 59,840,000 bits. Reasonably-priced hardware is not currently available to generate such a large map substantially in real time.

While the use of a gray-scale monitor allows digitized continuous-tone pictures to be seen at full resolution and allows characters and line art to be seen without the staircase effect, its use makes the electronic publishing system more complex because separate data bases must be produced to describe the areas of the page image that are text and that are digitized pictures, and separate maps must be used for display and printing. The need for these separate data bases makes the arrangement and rearrangement of the page images more difficult and slower with any given host computer.

A principal object of the present invention is therefore to provide a novel electronic printinig system that permits a high level of performance to be achieved at significantly lower cost than has been possible with prior art configurations. Yet another object of the present invention is to prvide such a system that permits the display of page images containing typographic characters, line art and gray scale pictures, the typographic characters and line art being anti-aliased for improved legibility.

Other objects of the present invention are to provide such a system in which page images may be printed directly and with relatively high resolution from an electronic map used to display substantially the same image as an electrooptical display device; to provide such a system capable of printing gray scale images with at least 64 gray levels and a resolution of at least 100 super-pixels/inch on line-raster printing devices with resolutions under 800 line/inch; to provide a system that includes an electro-optical display and a graphic printer, which system is capable of integrating typographic characters and/or graphics information and half-tone screen information, all in a single data base from which one may either (or both) print the data out on the printer or display the data on the display; to provide such an electronic printing system that requires substantially less working memory to display and print pages than had been required by prior art electronic printing systems; and to provide such a novel electronic printing system that is relatively independent of the printing characteristics of its printer.

To effect these and other objects of the invention, there is provided a novel system for displaying page images including typographic characters, graphics and/or gray scale, which system comprises storage means containing a set of substantially disjoint index numbers divided into two different subsets. The term "disjoint", as used herein, means having no members in common in a set, i.e. every number is unique. The term "substantially disjoint", as used herein, is intended to indicate, however, that not necessarily all, but most, of the members of a set are unique.

The first subset of index numbers stored contains gray-scale information and thus represents a set of gray-scale super-pixels corresponding in number to the set of levels in the gray scale of the system.

In the present invention, the dots or points in selected cells are arbitrarily ordered to represent one or more shapes embodying information with respect to an edge of a character or graphic form as well as incorporating a "gray-scale" aspect. Thus, the second subset of index numbers includes such information regarding the shape (including orientation) of an edge and preferably represents a set of another type of super-pixels (i.e. shape-segments) corresponding to preselected fragments of typographic characters and line art.

Means are provided for storing an image of the data to be displayed or printed, as an array of the index numbers ordered in accordance with those data. Means are also provided for setting the intensity of a corresponding pixel on an electrooptical display screen in accordance with each of the index numbers stored in the array, and for controlling the printing of a pattern of dots with a cell to produce corresponding gray-scale super-pixels or shape-segment super-pixels accordingly as the index number is in the first or second subset. The spatial arrangement of dots in each printed super-pixel embodying gray-scale or edge-shape information is to a large extent arbitrary and is clearly dependent upon the capabilities of the printing device itself. Thus, it is to be understood, in essence, while the gray-scale and edge-shape information is abstract, the printed embodiment is only an approximation of the abstract information, and that embodiment may be varied according to the printing equipment employed or improvements made to such equipment.

The system also includes main digital memory means for storing the data (digitized text, line art, pictures etc.) as a plurality of binary-encoded words each of the binary-encoded words containing one of the index numbers.

The system of the present invention also includes digital-to-analog conversion means connected to the output of the storage means, for converting a sequence of the index numbers into a sequence of corresponding analog signals. Means are included for coupling the output of the digital-to-analog conversion means to a CRT so as to activate selected pixels of the latter in accordance with the sequence of analog signals.

In a preferred embodiment of the present invention, the system also includes a video camera for forming photographic images and converting same into at least some of the digital data to be displayed by the system.

The invention described hereinafter provides, inter alia, not only a system for electronic editing of a page on a CRT and for printing that page substantially as shown but, in another sense, provides an improved data compression and decompression system that permits one to both display and print subtantially the same page of typographic characters, graphics and/or pictures with a considerably reduced amount of electronic storage and processing equipment.

Other objects of the invention will in part be obvious and will in part appear hereinafter. The invention accordingly comprises the apparatus possessing the construction, combination of elements, and arrangement of parts which are exemplified in the following detailed disclosure and the scope of the application of which will be indicated in the claims.

For a fuller understanding of the nature and objects of the present invention, reference should be had to the following detailed description taken in connection with the accompanying drawings wherein.

Figure 1:
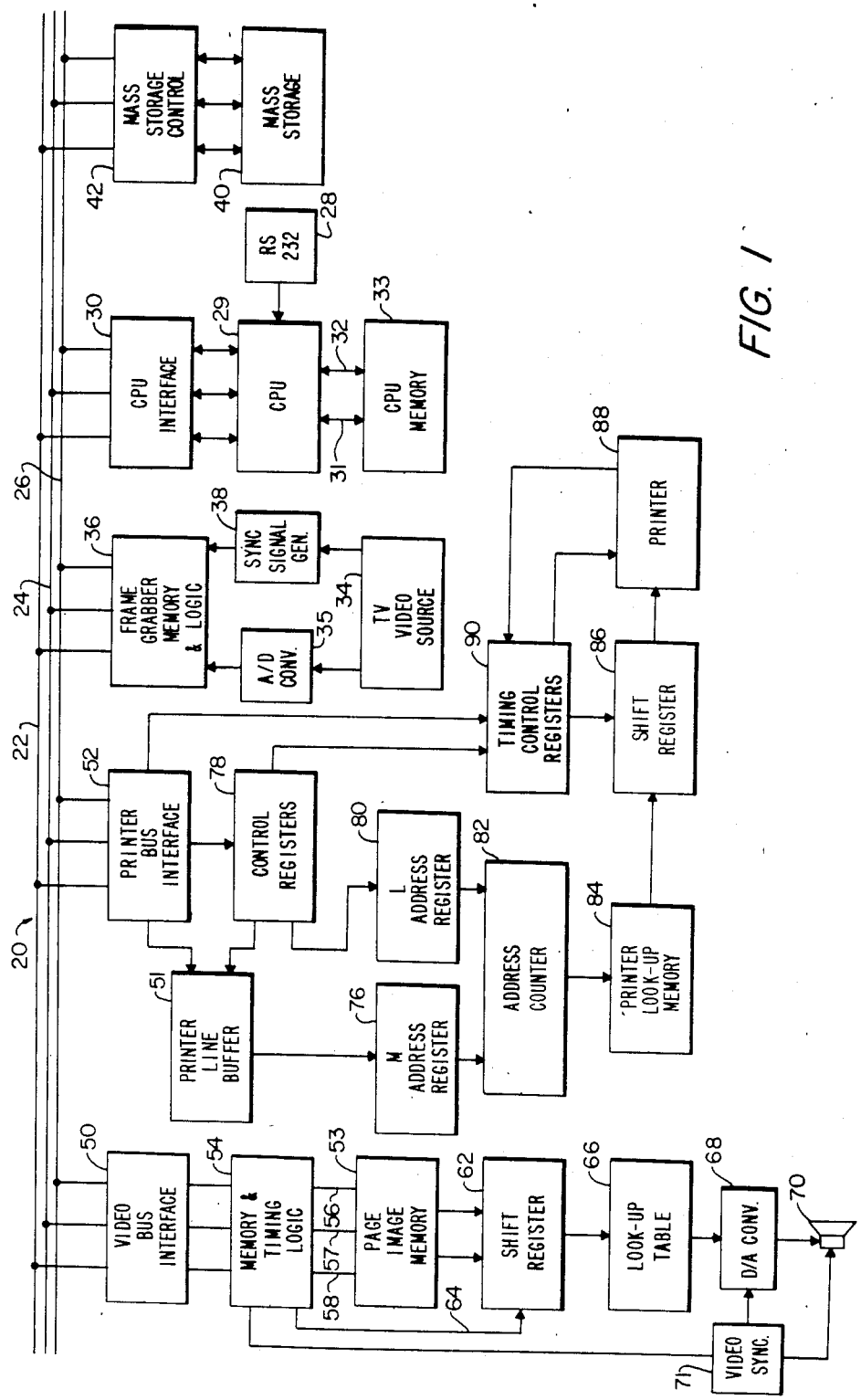
FIG. 1 is a block diagram illustrating the principal parts of a system embodying the present invention.

The apparatus of the present invention, as particularly shown in FIG. 1, broadly comprises a system for integrating digital data including typographic characters, line art and picture information, selectively alternatively or simultaneously to be displayed on a CRT or other raster scan imaging system, or printed as by a line-raster printer or dot matric printer. To this end the apparatus of the present invention includes central transmission channel means or bus 20 comprising three channels: control signal channel 22, address signal channel 24 and data signal channel 26.

The data to be manipulated and reproduced by the system can originate from a number of sources. For example, data are typically created as alphanumeric text on a keyboard of a word processor (not shown) that converts the text into digital data, or as graphics on the screen of a CRT using, for example, a "mouse" and appropriate software to create the screen image and convert it to digital data. Such data are fed into the system as through serial input port 28, typically an RS-232 port to central processing unit (CPU) 29. The latter typically may be an MC68000 microprocessor commercially available from Motorola, Inc. of Chicago, Ill., and is coupled to all three channels of bus 20 through CPU bus interface 30 that serves as an I/O device to the bus. CPU 29 is also coupled, typically by a plurality of parallel data lines 31 and address lines 32 to CPU memory 33.

Another source of data for the system of the present invention is video source 34, typically a video camera, the output of which is digitized by analog-to-digital (A/D) converter 35. Alternatively, source 34 may simply be a charge-coupled device (CCD) that scans a scene or object and provides a serial analog output train directly. Means, in the form of frame grabber memory and logic 36, are connected between the output of A/D converter 35 and all three channels of bus 20 to serve as an I/O device to the latter. Frame grabber memory and logic 36 serves to store the digitized information from video source 34, preferably organizing that information as data representing individual images or frames. A frame grabber useful in the present invention is included in the Model VG-131-06-61 device available from Datacube, Inc., Peabody, Mass. Also, means in the form of sync signal generator 38 are coupled to source 34, converter 35, and memory 36 to insure, as well-known in the art, proper synchronization in the operation of these latter elements.

Yet another important source of data for the system is a main digital memory means, such as mass storage 40, for storing data as a plurality of binary-encoded words or index numbers. Storage 40, for example may be any or all of a floppy disc, hard disc, digital tape storage and the like, and the usual drive and switching mechanisms for reading the discs or tape. Storage 40 is coupled to all three channels in bus 20 through another bus I/O device, mass storage control logic 42, typically a DSD-7215 unit commercially available from Data Systems Design of San Jose, Calif. Logic 42 serves to transfer data and other signals in a controlled manner between bus 20 and mass storage 40 when desired.

Other I/O devices are coupled to bus 20 for transferring data, control and address signals used in converting data into images by the system, and are shown as video bus interface 50 and printer bus interface 52. I/O devices are coupled to bus 20 for moving data for ultimate conversion to an image, either printed or displayed, and are shown as printer line buffer means 51 and page image memory 53. Interfaces 50 and 52 are coupled to all three signal channels in bus 20, while printer line buffer means 51 is connected to an output from printer bus interface 52.

Interface 50, intended to accept control, address and data signals for display of the latter on a device such as a CRT, has its output connected to memory and timing logic 54, the operation and structure of which will be described hereinafter. The output of the logic 54 is coupled through data line 56, address line 57 and control line 58 to corresponding input terminals of page image memory 53. The latter, typically a random access memory (RAM), is organized for storage of, for example, $10^6$ 8-bit bytes of data from channel 26. Output connections from RAM 53 (for example, in the form of 128 parallel lines representing 16-pixels) are coupled to corresponding inputs of shift register means 62. Clock line 64 is connected between an output from logic 54 and the clock terminal of shift register means 62 to provide the necessary sync signals to the latter to insure proper timing in its operation. The output of shift register means 62 in turn is connected to the input of a secondary memory or CRT look-up table, typically in the form of preloaded read-only-memory or ROM 66. The output of ROM 66 is coupled through digital-to-analog (D/A) converter 68 to the intensity control input of an electro-optical display device such as CRT display 70. Video sync means 71 are appropriately connected to logic 54 and A/D converter 68 and display 70 for controlling operation of the latter. If one wishes to provide more flexibility to permit use of different types of CRTs, one may employ a RAM in place of the ROM 66, the CRT look-up table being in such case loaded into the RAM on command from bus interface 50.

The output of buffer means 51 is connected to an input of the M (or most significant bit) address register 76. Buffer means internally can comprise a demultiplexer feeding a pair of parallel printer line buffers, each of which has a typical capacity of 1000 bytes, the output of the line buffer being then fed into the input of a multiplexer.

Printer bus interface 52 has its output connected to the input of control register means 78 in which the printer address and printer control signals passed by interface 52 are stored. Outputs from register means 78 are connected to buffer means 51 and to L (or least significant bit) address register 80, so that buffer means 51 and register 80 are controlled by appropriate signals from register means 78.

The outputs from address registers 76 and 80 are connected to the input of address counter 82, the output of the latter being connected to the input of printer look-up memory 84. The latter is provided typically in the form of a preloaded read-only memory (ROM). A control input to ROM 84 is connected to an output from interface 52. The output of ROM 84 is connected through shift register 86 that converts a parallel signal output from ROM 84 into a serial signal train for introduction into the data input terminal of printer 88. If one wishes to endow the system with more flexibility to accomodate for different types of printers, it may be desirable to provide memory 84 in the form of a random access memory (RAM) rather than as a ROM. In such case, the matrix information, instead of being prestored in memory 84 as hereinafter described, should be loaded on command into the RAM through an appropriate connection from bus interface 52.

Printer timing control means 90 is provided, its inputs being connnected to outputs from interface 52, register 78 and printer 88 so as to accept control signals from the latter. The outputs of printer timing control means 90, in turn are connected to appropriate control input terminals of register 86 and printer 88 so that the latter are controllable by signals from timing control means 90.

Figure 2:
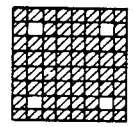
FIG. 2 illustrates several idealized and enlarged typical gray-scale matrices.
Figure 2:
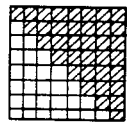
Figure 2:
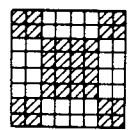
Figure 2:
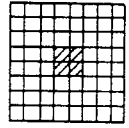
Figure 2:
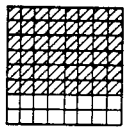

For purposes of the present invention, the data are organized for printing as either gray-scale cells or matrices or shape-segment cells or matrices as hereinafter described. Each matrix is preferably organized as an nxm cell of binary values, and a preferred form is an $8 \times 8$ cell. All examples hereinafter given will be based upon the 8-bit format, but other numbers of bits, such as 6, 10 or the like, may also be used depending on the total number of states one wishes to represent. The use of 8-bit binary values permits one to define 256 states. Of these, the first 64 states (i.e., those represented in sequence by binary numbers from 00000000 to 00111111) may be used to represent corresponding unique gray-scale values. The 64 gray-value matrices are each a square $8 \times 8$ cell of binary-valued numbers that can also be described in terms of the corresponding physical analog i.e. black or white elements. Such cells will then range from one which has no black elements to one which has no white elements, the black elements for all intermediate-valued cells being preferably in a distribution weighted most heavily to clump the black elements substantially centrally in each cell (or distribute the white elements toward the periphery of the cell), thus creating, for the 64 matrices, a series in which the single center dot of the lightest gray level appears to expand in size from a minute element to a large composite center to a completely filled cell. For example, there is shown in FIG. 2 a number of representative gray-scale matrices, of which the cell at FIG. 2a contains only 4 black elements, the latter being are distributed centrally in the cell. In FIG. 2b, the cell is shown with 32 black elements of the total 64. Again, the elements in FIG. 2b are centrally distributed. In the yet darker cells as exemplified by FIG. 2c where 60 of the 64 elements are black, the white elements are distributed peripherally.

Each of these gray-scale matrices are prestored in the form of eight 8-bit binary bytes in a look-up table in printer memory 84. Each such matrix is addressed in storage by the corresponding last 6 bits of the sequence of the first 64 8-bit binary numbers of the data. For example, the address of the matrix with no black elements (or all binary ones) may thus be 000000. The matrix formed of half binary ones and half binary zeros is similarly addressed at 0111111. One may use binary values with larger numbers (such as 16) of bits each, for example if one wishes not only to establish a gray-scale with a larger number of levels, also to do so in a plurality of colors.

Figure 3:
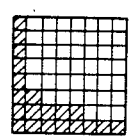
FIG. 3 illustrates several idealized, enlarged typical micro-shapes or shape-segment matrices.
Figure 3:
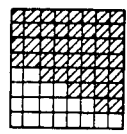
Figure 3:
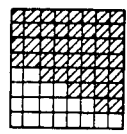

Of the 256 states identifiable by an 8-bit binary number, the first 64 are used as above-described as addresses for 64 corresponding unique gray-scale matrices stored in memory 84, and the remaining 192 numbers of the 256 are then used to address predefined shape-segment matrices. The shape-segment matrices are preferably defined by an arrangement (typically 8×8) of binary numbers prestored in another look-up table in memory 84, but in such shape-segment matrices the same binary values or elements are grouped contiguously and non-centrally, thereby to define a microedge or shape. For example, there is shown in FIG. 3a a matrix defining a vertical straight edge disposed two bits from the left matrix margin. In FIG. 3b there is shown another straight edge, but disposed horizontally four bits from the top matrix margin. In FIGS. 3c and 3d there are shown two matrices with diagonal edges ascending with different slopes to the right. FIG. 3e shows a matrix with an irregular edge. In the preferred embodiment of the invention there are selected and prestored 192 different shape-segment matrices of the type herein described, each addressed by the second sequence of 192 binary numbers.

Figure 4:
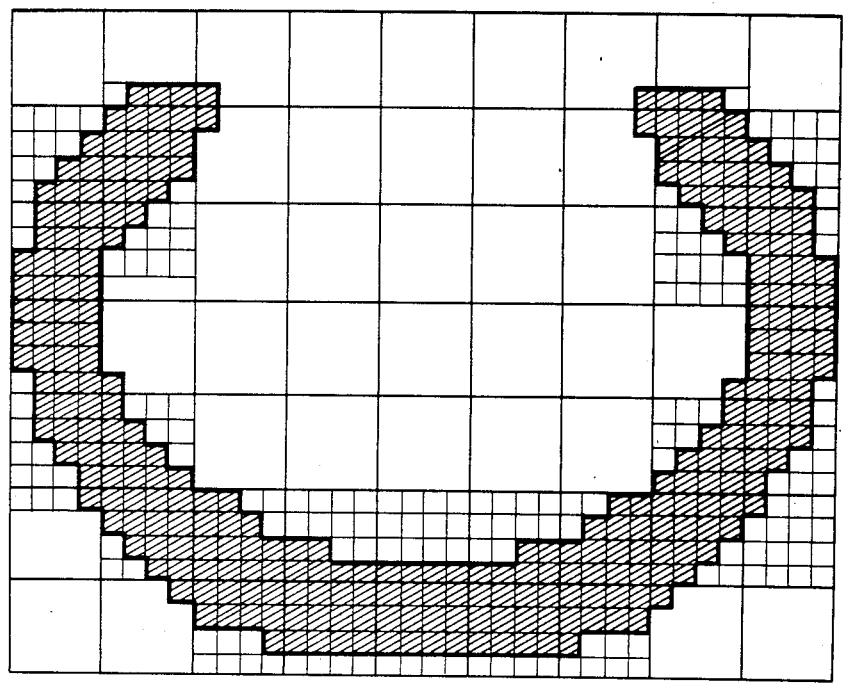
FIG. 4 is an enlargement of an alphanumeric character formed as a composite array of selected shape-segment matrices.

By combining or assembling selected ones of these 192 different shape-segments, one can define image edges of any desired curvature of typographic characters or a graphic line on the CRT or on the printer. Consequently, stored in mass storage 40 are preferably a plurality of fonts of typographic characters, each of which is in the form of an array or assemblage of shape-segment matrices identified, in mass storage 40, by a set of the respective addresses to memory 84. For example, in FIG. 4 there is shown the letter "C" formed of a plurality of edge sets (here 4×4 matrices for ease in illustration).

The second sequence of 192 binary addresses also constitutes additional addresses of values prestored in memory 66. Those prestored values in memory 66 at such addresses each represent a linear transform into a corresponding intermediate gray level that is used, as will be described hereinafter, to provide anti-aliasing in images formed on CRT 70.

The use of such gray-scale and shape-segment matrices endows the present invention with flexibility by avoiding the usual requirement of employing substantially disjoint bit maps to represent characters on the CRT and the printer, and permits one to define both video images and typographic characters in terms of these stored matrices.

In operation, to form and reproduce a video image either or both on a video display screen or in printed form, as is well known in the art, a continuous image is scanned by video source 34 and is sampled in the spatial domain to produce an ab array (or frame) of discrete samples, typically 640×480. The samples are then quantized in brightness (or intensity) by using $2^K$ levels to produce a serial signal train with abK bits per frame. The bits are organized in K-bit bytes, each of which represents the corresponding light intensity of each image-element read in sequence during a raster scan of the imaging device, wheter the latter is a video camera or a CCD. The sequence of intensity values in binary form is stored in frame grabber memory 36 until the next vertical sync pulse from generator 38 indicates the end of a frame. The frame grabber operates so that if a signal has not been received from the operator to preserve that frame, the next frame replaces the previous frame. When an appropriate signal is received from the operator, the frame in memory is frozen and storage of subsequent video frames is inhibited.

Data introduced into port 28 is typically in an ASCII string of 8-bit bytes, each of which represents either an typographic character or a control symbol. These bytes are stored in the memory of CPU 29. Memory 33 should have, inter alia, sufficient storage to accept a desired number of currently available applications programs that the designer wishes to run on the system of the present invention, for example, typesetting, layout, word processing, graphics, generation, and the like. A particular stored program provides byte mapping, and under the control of such a program, byte maps of various fonts of typographic characters can be preprepared and stored in mass storage 40 as hereinafter described, each character being addressed by a corresponding byte originally representative of the ASCII character.

Figure 5:
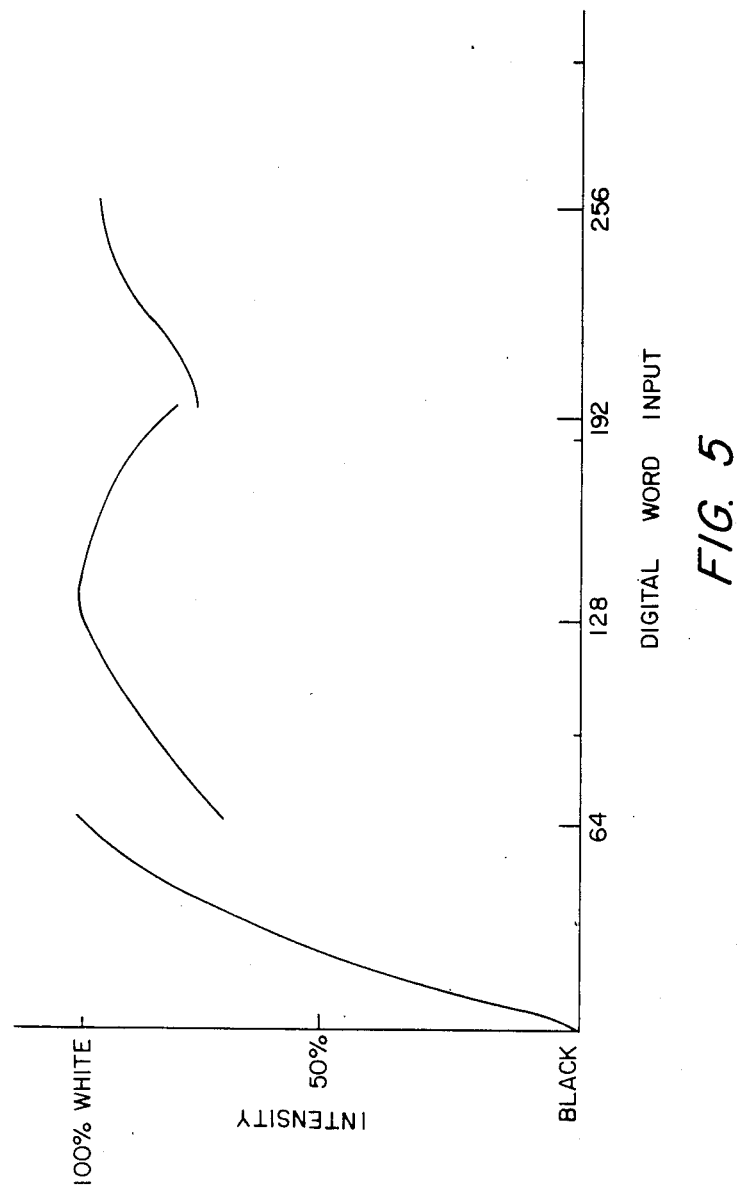
FIG. 5 is a a graphical representation of a transform curve for the 256 states represented by the 8-bit code employed in one embodiment of the present invention.

Upon command of the operator, those digitized signals representing the frozen frame, or the binary digits in the byte maps, may be transmitted as a serial train of such bytes (here K=8) from frame grabber memory 36 or storage 40 as the case may be, to memory 53 and from memory 53 as a parallel output of sixteen bytes. The output of memory 53 is fed to registers 62 to adjust timing and transform the parallel byte input back into a serial byte train. This latter output is fed into look-up table 66 where the last 6 bits of each 8-bit byte serve as an address for a corresponding gray level value. While one could convert the 6-bit addresses directly to analog values for display, it is preferred to go through the look-up table because the relation between the intensity values recorded by the camera and what one wishes to reproduce may not be the same or even linearly related. Thus, there is prestored in memory 66 a sequence or array of substantially disjoint index numbers or digital values, each representing, when converted by digital-to-analog converter 68 into a corresponding analog voltage, an excitation intensity of the phosphors of CRT 70 along a first gray scale from in typically equal increments over a first dynamic range from zero to full intensity. The 64 index numbers, here 8-bit binary values, selected to represent to gray-scale of the printing system then constitute the respective addresses of the first gray-scale values stored in memory 66. Thus, upon applying the 8-bit binary numbers from shift register 62 to the input of memory 66, it will be seen the output of memory 66 will be a series of 6-bit (minimum) binary digits which, when converted to voltages, will control the CRT excitation across the desired first gray-scale of 64 levels. The remaining substantially disjoint 192 index numbers or binary addresses for shape-segment matrices stored in memory 84 for the printing system, are here used as addresses for a second set of gray-scale values across a second dynamic range, much lesser than the first dynamic range of the first gray-scale. The second gray-scale is used to alter image edges on CRT 70 at gray levels that provide anti-aliasing. The transform curve for the 256 states or addresses and the corresponding values stored in memory 66, is shown in FIG. 5 wherein the addresses 0 to 63 (binary) represent the first gray-scale values, and the addresses from the binary representation of decimal 64 to the binary representation of decimal 255 represent a plurality of lesser increments of gray-scale over a reduced dynamic range.

The array of binary numbers from table 66, representing the data obtained from video source 34, when transmitted for display on CRT 70, are converted directly by D/A converter 68 to corresponding analog values, each of which represents an intensity level at which a corresponding phosphor dot on the screen is excited. Thus the video system converts to an array of digital values, the analog levels of an image read by video source 34, manipulates or alters the array of those digital values to achieve desired changes in the image, and reconverts of those digital values back into analog values for display on a TV monitor or CRT. With respect to typographic characters or graphics information, the video system is addressed by binary numbers that in the printing portion of the present invention are addresses for shape-segment matrices, but in the video portion of the present invention represent a sequence of CRT excitation values across a relatively small or second, third, etc., dynamic ranges (such as as shown in FIG. 5), which values are stored in a look-up table.

When one wishes to display a typographic character or a graphic line on CRT 70, from a particular font stored in storage 40 the binary addresses of that particular sequence of shape-segment matrices used in that character or line are fetched, being then sent on to look-up table 66. At the latter, the sequence of levels (in binary notation) corresponding to the sequence of addresses is provided and forwarded to converter 68.

The output from converter 68 is fed to CRT display 70 where a raster display of those levels as excitation voltages for the screen phosphor will create the desired image of the selected typographic character. The image displayed on the screen can then be manipulated as desired, for example, cropped, rotated, shifted, or its contrast and overall brightness altered. Depending on the nature of the applications programs preferably stored in memory 33 or mass storage 40, the image can also be highlighted, painted, or erased in part or whole. The system preferably includes means for selecting a desired area on the display of the page being worked on, and permitting the operator to select and more to a new location all or part of that selected area. These steps are accomplished simply by identifying those index numbers that correspond to the selected area, rearranging those index numbers to shift the area across the display to the new location, the rearranged array of index numbers thus being stored in place of the original array. All such known operations, the details of which are here not pertinent, are achieved in accordance with the applications programs operating on the data stored in memory 53, the ultimate result of such operation being shown, substantially in real time, on the CRT. Thus, when operator has achieved a modified video image, as desired the information representing that modified image is stored both in page image memory 53 in ordered form and in duplicate in mass storage 40.

It will be apparent that while simply converting the digital value of the binary numbers to corresponding analog values will suffice to provide a CRT image with a 64-level gray-scale, this technique will not provide adequate information to permit one to form an image on a "gray-scale" of only 2-levels as provided by a typical printer. Thus, in the present invention, each of the 8-bit numbers employed as addresses to the first gray-scale values of maximum dynamic range stored in table 66, are also used as addresses to a plurality of gray-scale super-pixels or gray-scale matrices stored in memory 84. Typically, each such super-pixel will be about or less than 0.01 inches in height and in width, so is well below the normal limit of resolution of one's eye.

To these ends, the video data and/or the typographic information, as it may have been modified and stored in both memory 60 and mass storage 40, are placed on line 26, usually as a series or sequence of 8 parallel-bit bytes, and transmitted to buffer means 51 and printer bus interface 52. It should be remembered that each such byte represents the address of either a corresponding shape-segment matrix or a gray-scale matrix stored in memory 84. As noted hereinbefore, buffer means 51 preferably is a double line buffer which serves to adapt the timing of the signal transmisswion rate to one suitable for use in the printing system. The output of buffer means 51 is fed to address register 76 that stores and shifts out only the sequence of bytes representing the first row or horizontal line of the character to be printed. A command at to how many lines are in each matrix to be printed is loaded through interface 52 into register 78. The output from register 76 is fed into address counter to provide the identification or sequence of addresses for the requisite gray-scale or shape-segment matrices to be fetched from memory 84. The first lines of each of these matrices, in sequence, are then fetched from memory 84, shifted into a serial train in register 86 and printed out as a line of two-valued intensity dots on printer 88. The address counter is then incremented by one by register 80 and the second lines of each of the selected matrices are then printed in sequence in a line of dots below and in register with the first line of dots. Counter 82 is incremented by one until the complete number of lines (typically eight) required to print each complete matrix, has been completed. At this point, register 76 loads the sequence of addresses of the next row of matrices to be printed and the operation is repeated with the new matrices. This operation is required because the printer is usually unable to print each matrix simultaneously but must do so in terms of a sequence of lines of dots.

While for convenience in exposition the formation of gray-scale super-pixels and shape-segment super-pixels by a printer has been described in terms of points or dots, it is to be understood that the invention is not limited to any particular form of dots. For example, while the dots are desirably minute geometric shapes, they can assume any geometric form, regular or irregular, for example, circles, diamonds, squares, lines, blotches, or the like. In a preferred embodiment, the printer is a laser, line-raster type printer as previously described, and the cells or super-pixels formed by the printer typically are two or more raster lines in height. In such case, the cells are printed by turning the laser on and leaving it on, for example for a predetermined multiple of a base time period, thereby to provide a variable-length, raster line segment that is equivalent to a multiple of a number of contiguous dots. In essence, then, the "dots" are essentially rendered as contiguous exposures provided by the multiple of the time period during which the laser excites the photosensitive surface to which it is directed. The maximum line segment provided in such case should not be greater than the length of the cell. In other words, the length of the pixel should equal or exceed the maximum segment produced by the laser operated over the largest time multiple represented by a binary index number.

It will be appreciated that while the significant information in a font character is printed out from shape-segment matrices having a number of black dots therein, the background of the character in fact is usually white, and that portion can be represented by the "all-white" matrix which may serve a dual function as a gray-scale matrix and a shape-segment matrix, as may the "all-black" matrix.

In displaying typographic characters and the like on the CRT, the shape-segment addresses are translated into excitation voltages across the smaller dynamic range, and the use of these medium grays to form the edges of the displayed charcter, blur or fill in the relatively sharp staircase effect that would otherwise occur, thereby providing effective anti-aliasing.

Since certain changes may be made in the above apparatus without departing from the scope of the invention herein involved, it is intended that all matter contained in the above description shall be interpreted as illustrative and not in a limiting sense.

What is claimed is:

1. A system for scanning and storing an image, said system comprising in combination:
   means for scanning said image and for converting each scan into a set of substantially disjoint index numbers, said set including a first subset of said index numbers each representing information corresponding to the gray scale level in a respective area of fixed size in said image, and a second subset of said index numbers, each representing information corresponding to the shape of at least a portion of an edge in an area of said fixed size in said image;
   storage means storing a set of fixed number of predetermined image elements, each in the form of a unique sequence of digital bits, a first subset of said image elements each representing a respective level in said gray scale, and a second subset of said image elements each representing a respective edgedefining value;
   means for retrieving image elements from said storage means responsively to a sequence fo said index numbers as produced by said scan; and
   means for displaying retrieved image elements in a substantially rectangular array in which indicia representing said image elements are disposed according to said sequence.

2. A system as defined in claim 1 wherein each of said image elements is stored as an plurality of n-bit words.

3. A system as defined in claim 1 wherein said image elements in said first subset of elements are addressable in said storage means by numbers in said first subset of index numbers, and said image elements in said second subset of elements are addressable in said storage means by numbers in said second subset of index numbers.

4. A system as defined in claim 1 wherein said index numbers are m-bit binary numbers, m being an integer greater than 4.

5. A system as defined in claim 4 wherein m is 8.

6. A system as defined in claim 4 wherein the image elements in said first subset of said elements are addressable in said storage means by sixty four of said binary numbers, and the image elements in said second subset of said elements are addressable in said storage means by one hundred ninety two others of said binary numbers.

7. A system as defined in claim 6 wherein said image elements of said first subset are addressable in said storage means by binary numbers representing 0 to 63 respectively, and said image elements in said second subset are addressable in said storage means by the binary numbers representing 64 to 255 respectively.

8. A system as defined in claim 1 wherein said means for displaying includes printer means, and wherein each of said image elements of said first set is printed by said printer means to produce a square matrix corresponding to the original area represented by said each image element of said first set, and having a gray scale density level corresponding to the density level of said original area represented by said each image element of said first set.

9. A system as defined in claim 8 wherein each of said image elements of said second set is printed by said printer means to produce a square matrix corresponding to the original area represented by said each image element of said second set, and reproducing substantially the shape of at least a portion of said edge in said original area represented by said image element in said second set.

* * * * *

UNITED STATES PATENT AND TRADEMARK OFFICE
CERTIFICATE OF CORRECTION

PATENT NO.   :   4,675,743
DATED        :   June 23, 1987
INVENTOR(S)  :   John H. Riseman, et al.

It is certified that error appears in the above-identified patent and that said Letters Patent is hereby corrected as shown below:

Claim 1, column 15, line 43, after "of" (first occurrence), please insert -- a --;

Claim 1, column 15, line 50, please delete "edgedefining" and substitute therefor -- edge-defining --; and Claim 1, column 16, line 2, please delete "fo" and substitute therefor -- of --.

Signed and Sealed this

Thirteenth Day of October, 1987

Attest:

DONALD J. QUIGG

Attesting Officer

Commissioner of Patents and Trademarks